United States Patent [19]

Piguet

[11] 4,175,707
[45] Nov. 27, 1979

[54] HYDRAULIC INSTALLATION

[75] Inventor: Pierre Piguet, Onex, Switzerland

[73] Assignee: Ateliers des Charmilles S.A., Geneva, Switzerland

[21] Appl. No.: 904,929

[22] Filed: May 9, 1978

[30] Foreign Application Priority Data

May 12, 1977 [CH] Switzerland .................. 5931/77

[51] Int. Cl.² .............................................. F01D 9/02
[52] U.S. Cl. .................................. 239/456; 239/574; 415/202
[58] Field of Search .................. 239/456, 551, 574; 415/202; 60/39.53, 39.54, 39.58, 39.05

[56] References Cited

U.S. PATENT DOCUMENTS 807,025  12/1905  Henry, Jr. .......................... 239/456

FOREIGN PATENT DOCUMENTS 2345636   4/1974  Fed. Rep. of Germany ......... 415/202
450900   12/1974  U.S.S.R. .............................. 415/202
503036   11/1976  U.S.S.R. .............................. 415/202
54104201 12/1977  U.S.S.R. .............................. 415/202

Primary Examiner—Robert W. Saifer
Attorney, Agent, or Firm—Emory L. Groff, Jr.

[57] ABSTRACT

A hydraulic installation includes a gate valve and an injector rectilinearly mounted in series in a water inlet conduit which feeds a turbine. The injector includes a central body portion in which first and second servo-motors are housed. The first servo-motor controls the tip of the injector and the second servo-motor controls the movement of the plug of the gate valve. A single crosspiece secures the injector to an outer annular casing and also absorbs hydraulic forces otherwise exerted on the gate valve and the injector.

1 Claim, 1 Drawing Figure

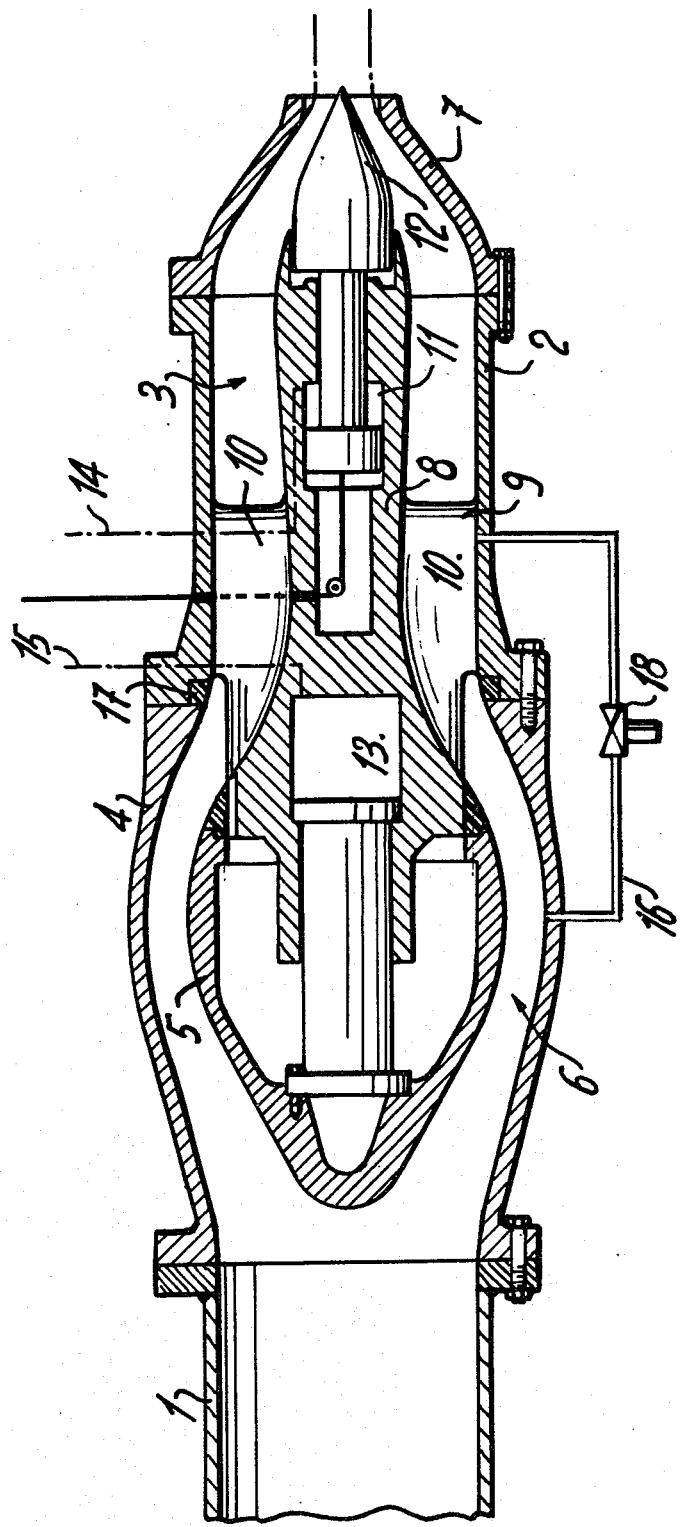

HYDRAULIC INSTALLATION

The present invention relates to a hydraulic installation for feeding a working turbine comprising a gate valve and an injector rectilinearly mounted in series in the water inlet conduit.

In known installations, the gate valve and the injector each comprise a central body supported by separate crosspieces in an outer annular extension of the water inlet conduit.

Because of the presence of a crosspiece for each element either the gate valve or the injector, these hydraulic installations are relatively lengthy and cumbersome.

The object of this invention is to provide a less cumbersome installation which permits reducing the cost thereof and reducing the expense of construction work of the substructures necessary to accomodate such installations.

The hydraulic installation according to the present invention is characterized in that a servo-motor for controlling the gate valve and a servo-motor for controlling the tip of the injector are disposed in the same central body which is secured by a single crosspiece to an annular exterior body, said crosspiece also absorbing hydraulic forces otherwise exerted on the gate valve which would also be exerted on the injector.

The attached drawing shows schematically and by way of example a preferred from of execution of the invention.

The single FIGURE of the drawing is an elevational view partly in longitudinal cross-section.

The installation shown in the drawing is secured to the end of a water inlet conduit 1 of a working turbine of the Pelton type, not shown.

This installation comprises an outer casing 2 of the injector 3 connected by means of an annular collar 4 to the conduit 1.

The collar 4 comprises a hollow body which houses a displaceable plug 5 of a gate valve 6.

A nozzle 7 is fixed at the free outer end of the casing 2 of the injector 3.

A central body member 8 is secured to the outer casing 2 by means of a crosspiece 9 provided with four radial fins 10.

The central body member 8 is provided with a servo-motor 11 for controlling the head or tip 12 of the injector 3 and upstream from said motor 11 a second servo-motor 13 is provided for controlling the movements of the plug 5 of the gate valve 6.

These servo-motors are fed by fluid under pressure through conduits 14 and 15 shown in one of the fins 10.

In order to reduce the pressure on the fins 10 when the gate valve 6 is opened, a conduit 16 is provided with a valve 18 connected with gate valve 6 of injector 3, permits equalizing the pressure between them.

In the closing position of the gate valve 6, the plug 5 bears on a seat 17 mounted on the outer casing 2.

In the installation according to the invention, the hydraulic forces exerted on the gate valve and on the injector are absorbed by the single crosspiece 9 which permits obtaining a unitary gate valve-injector which is particularly short and not cumbersome with the financial advantages which flow therefrom.

On can conceive a number of variations of the invention and especially there could be provided an installation in which the outer casing 2 is secured directly to the water inlet conduit 1 which would have dimensions sufficient to contain the gate valve 5.

I claim:
1. A hydraulic installation for feeding a turbine, comrpising a gate valve and an injector mounted in series in a water inlet conduit, an annular outer casing housing said injector, a nozzle secured to one end of said casing, said injector including a central body, a tip at one end of said central body within said nozzle, a first servo-motor controlling said gate valve, a second servo-motor controlling the tip of the injector, said servo-motors each being disposed in said central body, a single crosspiece securing said central body to said annular outer casing, said crosspiece absorbing the hydraulic forces exerted on the gate valve as well as those exerted on the injector.

* * * * *